(12) United States Patent
Plummer

(10) Patent No.: US 7,165,247 B2
(45) Date of Patent: Jan. 16, 2007

(54) UPGRADING SOFTWARE HELD IN READ-ONLY STORAGE

(75) Inventor: Michael J Plummer, Redhill (GB)

(73) Assignee: Koninklijke Philips Corporation N.V., Eindhoven (NL)

( * ) Notice: Subject to any disclaimer, the term of this patent is extended or adjusted under 35 U.S.C. 154(b) by 485 days.

(21) Appl. No.: 10/210,496

(22) Filed: Aug. 1, 2002

(65) Prior Publication Data

US 2003/0041323 A1     Feb. 27, 2003

(30) Foreign Application Priority Data

Aug. 24, 2001   (GB)  ................................. 0120594.7

(51) Int. Cl.
  *G06F 9/44*   (2006.01)
  *G06F 9/445*  (2006.01)
(52) U.S. Cl. ............ 717/168; 717/169; 717/170; 717/174; 717/175; 717/176
(58) Field of Classification Search ........ 717/168–178; 70/201, 225 X, 226, 230–233; 301/110.5
   See application file for complete search history.

(56) References Cited

U.S. PATENT DOCUMENTS

| | | | | |
|---|---|---|---|---|
| 5,857,204 A * | 1/1999 | Lordi et al. | .................. | 707/202 |
| 6,611,957 B1 * | 8/2003 | Ebisawa | ...................... | 717/173 |
| 6,625,668 B1 * | 9/2003 | Sato | .............................. | 710/8 |
| 6,637,023 B1 * | 10/2003 | Ginsberg | ..................... | 717/122 |
| 6,639,544 B1 * | 10/2003 | Yamada et al. | ................ | 342/71 |
| 6,640,335 B1 * | 10/2003 | Ebisawa | ...................... | 717/172 |
| 6,640,336 B1 * | 10/2003 | Ebisawa | ...................... | 717/173 |
| 6,782,533 B1 * | 8/2004 | Ebisawa | ...................... | 717/171 |

* cited by examiner

*Primary Examiner*—Wei Zhen
*Assistant Examiner*—Qamrun Nahar

(57) ABSTRACT

A method and apparatus for upgrading software held in read-only storage are described comprising non-reprogrammable read-only memory (116) which stores a file manager program (120), program file A (122) and program file B (124) and a Flash® RAM (118) which stores file X (132). Under control of the file manager program (120), when an upgrade program file B+(126) is acquired, for example via the Internet, it is stored within Flash® RAM (118) and file X (132) is updated. When the software executes, file A (122) calls file B+(126) in preference to calling file B (124), in accordance with the contents of file X (132).

16 Claims, 3 Drawing Sheets

UPGRADING SOFTWARE HELD IN READ-ONLY STORAGE

FIELD OF INVENTION

The present invention relates to a method for upgrading software in a product and also to an apparatus configured to employ such a method.

BACKGROUND TO INVENTION

Many consumer products employ software in order to provide a broader range of features at a given price than is possible using hardware alone. The Consumer Electronics marketplace is increasingly competitive and lowest price solutions have to be sought—for example storage provided for software programs must be both low cost and utilised in flexible ways to accommodate functional variations. In addition, products are becoming increasingly dependent on upgrading, for example to fix bugs or perhaps to offer customisation to the end user.

Software programs are typically stored in non-volatile memory within a product, for example Read Only Memory (ROM) this generally having a lower cost per unit memory size than other forms of non-volatile memory.

As standard ROM is non-reprogrammable, silicon manufacturers have developed a variety of electrically reprogrammable non-volatile memory devices to supplement ROM including EEPROM and Flash® RAM. These types of devices allow the original software in ROM to be updated in the field. A disadvantage of such technologies is their relatively high cost; it is therefore desirable to minimise the amount of such memory used in products.

A further typical drawback of field upgradable products is the requirement that the upgrade software code be configured to be compatible with the specific hardware of the product. This can result in the need for several versions of the same upgrade code, each configured for a particular product hardware platform.

OBJECT OF INVENTION

It is an object of the present invention to combat these and other problems through an improved method and apparatus to upgrade software in a product.

SUMMARY OF INVENTION

In accordance with the present invention there is provided a method for upgrading software held within a product, the method being supported by means for program file management and program file calling, the method comprising the steps of:
 a) running a first program file from non-reprogrammable storage
 b) accessing a reference file from the first program file
 c) accessing a second program file by reference to the contents of the reference file, the second program file residing in non-reprogrammable storage
 d) updating the reference file to refer to a third program file so that subsequently executing steps a)–c) will result in accessing the third program file in place of the second program file.

The method allows program code which is not upgraded to still be executed from within non-reprogrammable storage whilst also accessing upgrade software modules residing in the reprogrammable storage (in place of original modules resident in non-reprogrammable storage). This has an added advantage that the original updatable software remains intact within the non-reprogrammable storage allowing the product to revert to the outdated original (but still functional) software in case of problems (for example in the case where the upgrade software is corrupted).

A further advantage is that the upgrade software is generally file based and therefore independent of any specific target hardware architecture. This may allow the same software update source code file to be useable by all products, irrespective of manufacturer, hardware design or implementation provided the program file management and program file calling means within a product supports the storage and linking of files so that the upgraded software functions correctly in the product itself.

Alternatively, implementations in which the program files are tailored to a particular hardware platform are also possible whilst still employing the method of the invention.

One example of a suitable program file management and program file calling means is Embedded Linux which utilises hard links and soft links (symlinks) to access by reference one file via another file or files. In addition, other suitable embedded systems based on Unix are available.

Acquisition of upgrade program files may be via any suitable means including, but not limited to, a network connection and a physical record carrier. In particular, networks available to the home consumer including terrestrial, satellite, cable and modem connections may be used for the distribution of upgrade files. Typically the Internet is also a convenient means to obtain upgrade files. Upgrade files may also be distributed on physical media such as floppy disk and CD-ROM.

Also in accordance with the invention there is provided an apparatus containing upgradable software comprising:
 a data processor operable to support the execution of a program to perform program file management and program file calling, to support the access of a file located within non-reprogrammable storage and to support the access of a file located within reprogrammable storage;
 non-reprogrammable storage operable to store the program for program file management and program file calling, to store a first program file and to store a second program file; and
 reprogrammable storage operable to store a reference file and to store a third program file,
 wherein the second program file or third program file is accessed by the first program file according to the content of the reference file.

A product may utilise any suitable means of non-reprogrammable and reprogrammable storage. Examples of non-reprogrammable storage include, but are not limited to, solid state memory such as mask ROM and one time programmable (OTP) ROM and also data carriers such as CD-ROM. Examples of reprogrammable storage include, but are not limited to, solid state memory such as EEPROM, Flash® RAM and also data carriers such as CD-R/W, floppy disk and hard disk. In addition, the reprogrammable storage of a particular product may be volatile or non-volatile as appropriate, according to the functional needs of the product.

A product may combine the economy of non-reprogrammable storage (for example read-only memory, ROM) to store non-upgradable software code with reprogrammable storage (for example Flash® RAM) to store the upgradable code. This may result in a cost saving compared to prior art schemes by avoiding duplicate sets of code residing in both non-reprogrammable and reprogrammable storage of the product.

A product according to the present invention also has advantages over prior art split storage solutions which utilise a mix of non-reprogrammable storage and reprogrammable storage, for example a combined ROM/Flash® RAM solution. Prior art solutions might reserve memory address space for particular upgrade modules; this may also imply that the size of upgrade modules is limited. In the present invention the source software module upgrades are hardware independent—therefore utilisation of available reprogrammable storage capacity, for example Flash® RAM memory, is more efficient in that upgrade files are loaded and stored as determined by the file manager, for example on a first come first served basis or perhaps based on user preferences. A manufacturer is therefore free to design his product to meet cost/functional needs without being constrained by a particular hardware implementation or cost, for example by needing to reserve memory address ranges for possible upgrade modules, or building in more (expensive) upgrade memory than in practice will actually be used.

BRIEF DESCRIPTION OF DRAWINGS

Further features and advantages will now be described, by way of example only, with reference to the accompanying drawings in which:

FIG. 1 shows an example where software within a product is upgraded, wherein

DETAILED DESCRIPTION

In the following description of the present invention the term 'reprogrammable' refers to a storage entity which has been programmed with data (for example program code) and which is capable of being reprogrammed with replacement data (for example upgrade program code); the term 'non-reprogrammable' refers to a storage entity which has been programmed with data but which is not capable of being reprogrammed. The term 'reference file' refers to a file whose contents may reference a data file, a program file or another reference file.

Figure 1A:
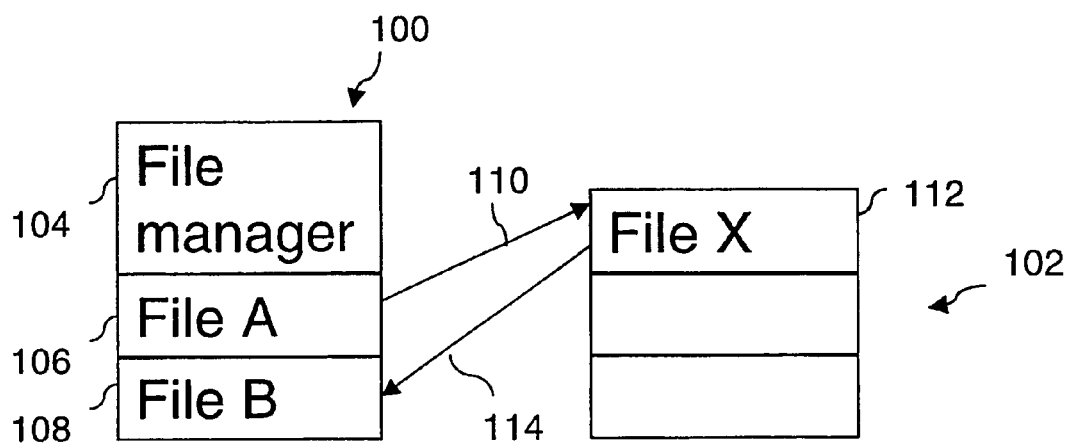
FIG. 1a depicts the software prior to upgrading and FIG. 1b depicts the software after upgrading.

FIG. 1 depicts an example where software within a product is upgraded. Referring to FIG. 1a, this depicts the software prior to upgrading. A non-reprogrammable read-only memory, for example a mask ROM, is shown at 100 and comprises storage for a file manager program 104, program file A 106 and program file B 108. The file manager is responsible for managing the storage and/or location of files both within the non-reprogrammable read-only memory 100 and also a reprogrammable store 102, for example a Flash® RAM. The reprogrammable store 102 may of course be any suitable storage for example a disk drive, a standard RAM, etc. and may or may not be non-volatile, as required. The file manager 104 is also responsible for maintaining links between the files so that the program as a whole executes correctly. To this end, for example when the product is reset, the file manager 104 will write a predetermined link file X 112 into the Flash® RAM 102. Execution of file A 106 causes file X 112 to be accessed 110. The contents of file X 112 (as initialised above) cause file B 108 to be called 114. In this way, file A 106 located in non-reprogrammable read-only memory 100 is able to call file B 108 also located in (the same or different) non-reprogrammable read-only memory by means of intermediate file X 112. This contrasts with prior art practice whereby file A would call file B using an address vector or similar hardware-specific mechanism.

Figure 1B:
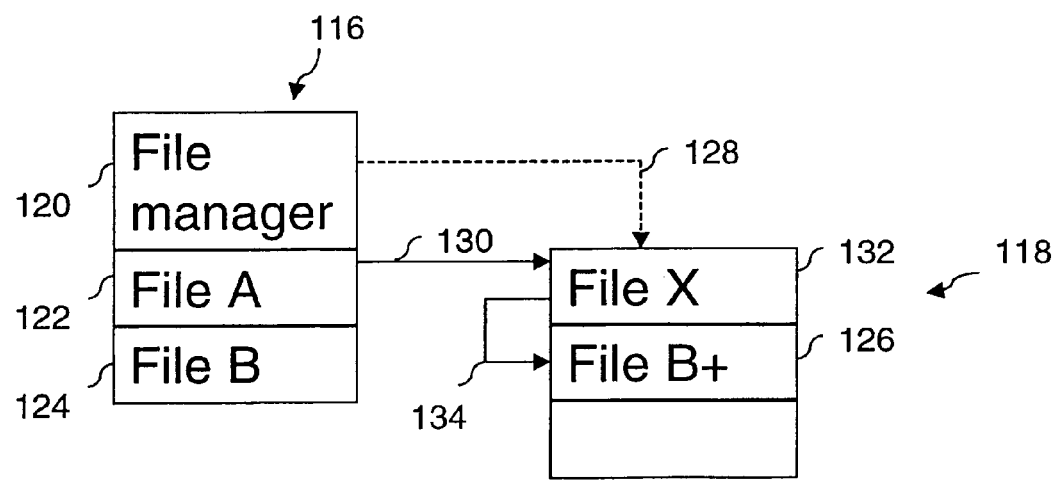

FIG. 1b illustrates the product software after upgrading. Non-reprogrammable read-only memory 116 comprises storage for a file manager program 120, program file A 122 and program file B 124, all equivalent to the corresponding items of FIG. 1a. An additional program file B+ 126 has been acquired and stored within Flash® RAM 118 under control of the file manager 120, said Flash® RAM 118 being equivalent to the corresponding item of FIG. 1a. File B+ 126 is intended as an upgrade to (that is, to be executed in place of) file B 124. The acquisition of file B+ is via any suitable means including physical media, for example CD-ROM or floppy disk, or via a network connection, for example Ethernet, terrestrial, cable, satellite or modem. The Internet is a typical source of upgrade files. The file manager 120 when it loaded file B+ 126 into Flash® RAM 118 also re-wrote file X 132 to point to file B+. Thus, when the software executes, file A 122 accesses 130 file X 132 as it did before in the example of FIG. 1a, however file X 132 now references file B+ 126 causing file B+ 126 to be called 134 in place of file B 124. File X 132 may contain a soft link or a hard link (for example in the case where File X 132 and File B+ 126 reside in the same storage).

In summary, file A always accesses file X (since file A is located in non-reprogrammable read-only memory); file X is modifiable by the file manager to refer to any file. It will be readily noted that the original file B 124 is always retained, and can be re-deployed following a product reset or for other default reasons by the file manager re-initialising file X to refer to file B.

Figure 2:
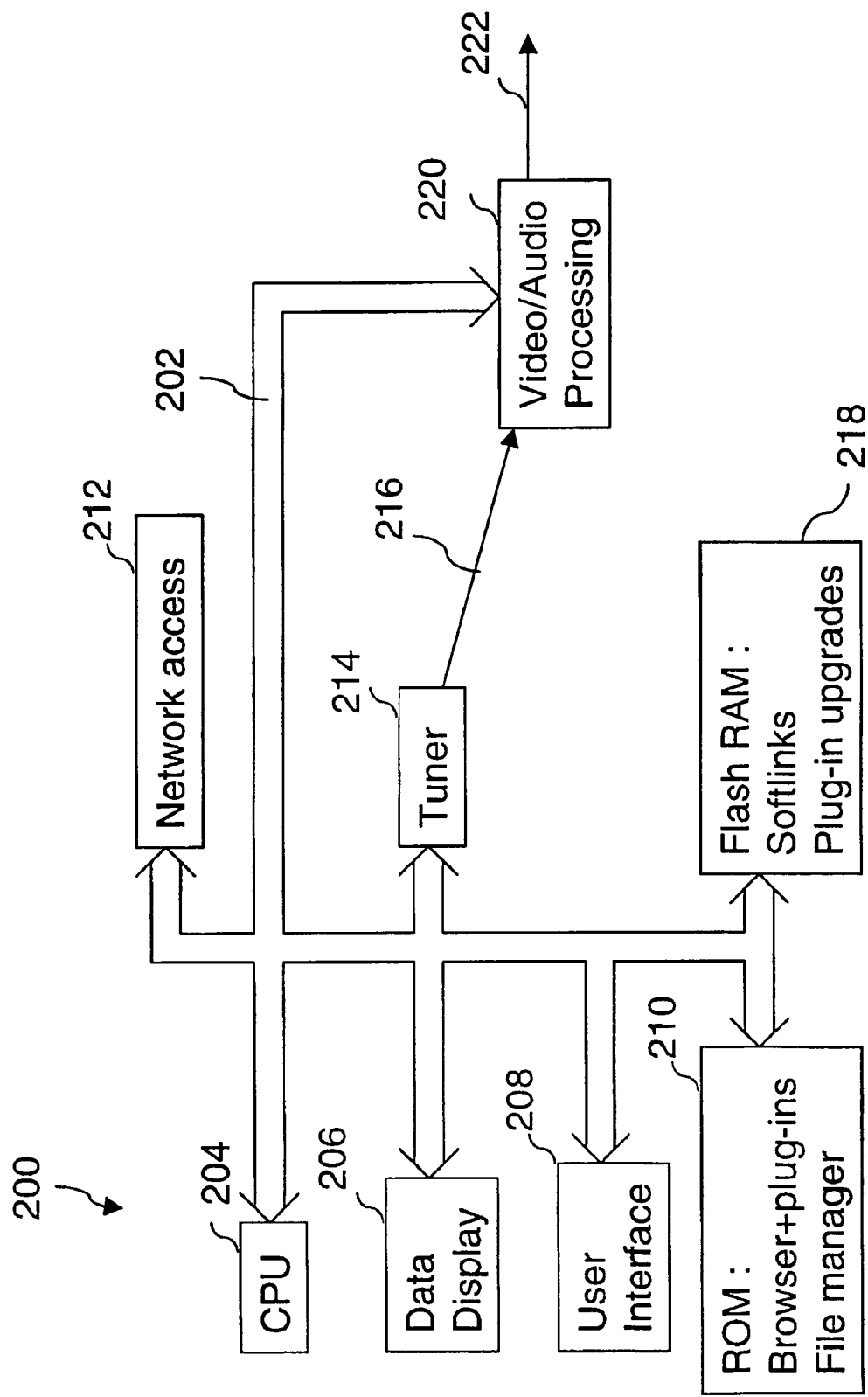
FIG. 2 shows a schematic representation of a Set Top Box (STB) consumer receiver embodying the invention.

FIG. 2 depicts a schematic representation of a set top box (STB) to receive satellite or cable television services and also for use as an Internet browser. A data processor unit shown generally at 200 comprises a CPU 204, data display 206, user interface 208, ROM 210, network access 212 and Flash® RAM 218 interconnected by bus 202. Tuner 214 accesses TV programme item material 216 and delivers the material to the video/audio processing unit 220. The ROM 210 comprises a file manager program, for example Embedded Linux and an internet browser application program. The internet browser program has one or more plug-in program files which are upgradable. The Flash® RAM 218 comprises one or more soft link files (also known as symlinks) plus additional memory capacity to accommodate one or more program files to upgrade those browser plug-in program files held in the ROM 210. In basic configuration, the browser executes from ROM 210 via the soft links held in the Flash® RAM 218; the user by means of user interface 208 controls the browser and Internet content is transferred to the video/audio processing unit 220 via bus 202 and then presented to the user at 222. Browser upgrade plug-in program files are acquired via the network access 212 and loaded by the file manager into Flash® RAM 218; soft links within the Flash® RAM 218 relating to the upgrade plug-in program files are also updated by the file manager. Future executions of the browser will then utilise the upgraded plug-ins as referenced by the updated soft links.

The foregoing description of a set top box apparatus is presented by way of example only and represents one of a range of implementations that can readily be defined by a person skilled in the art to exploit the advantages of the method as disclosed in the present invention.

Figure 3:
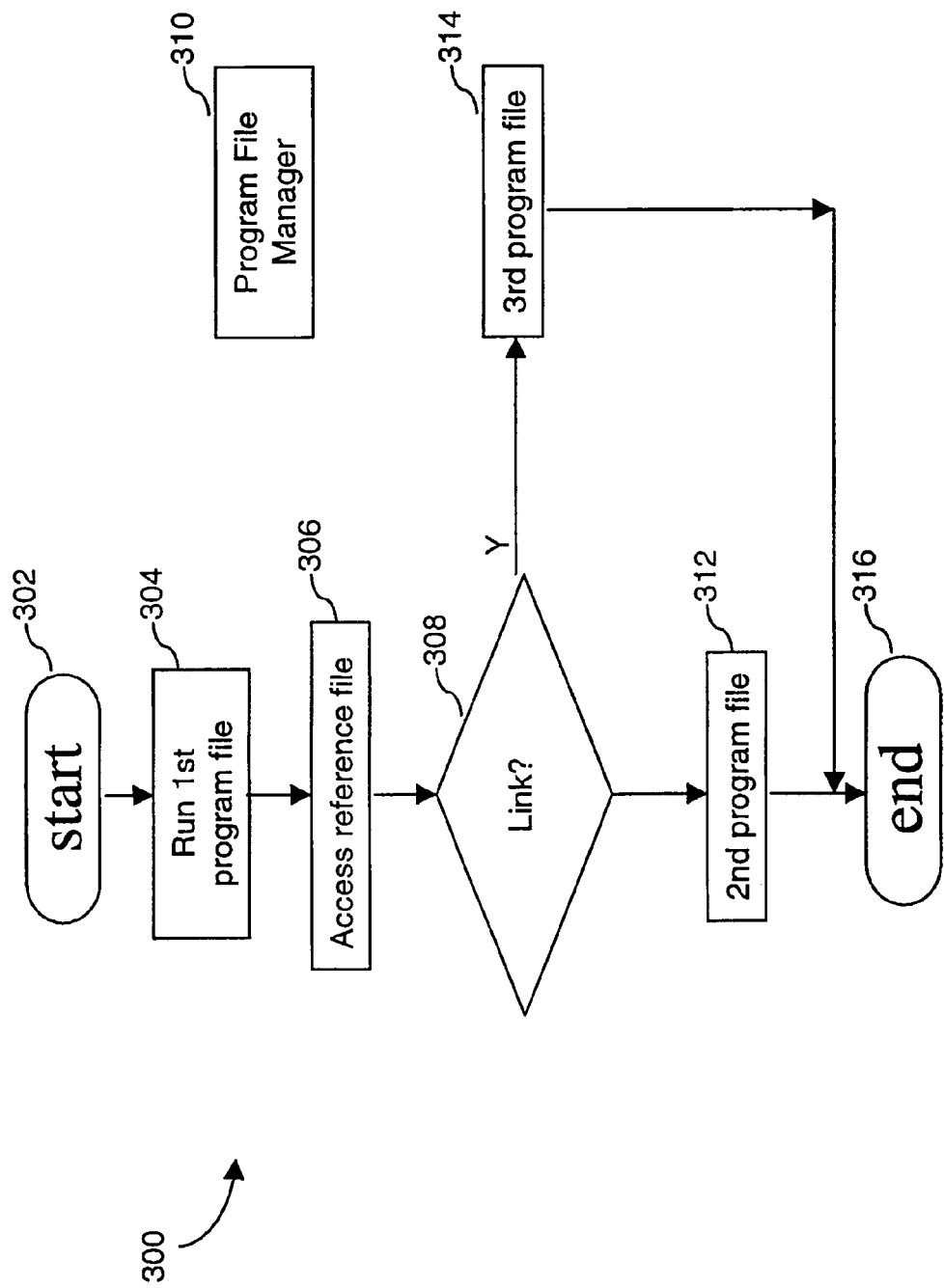
FIG. 3 shows a schematic representation of a method embodying the invention.

FIG. 3 depicts a schematic representation of a method embodying the invention. The method, shown generally at 300, starts at 302 and runs a first program file 304. The first program file accesses a reference file 306, the content of the reference file being managed by the program file manager 310. The program file manager, if the reference file contains a link, will at 308 access third program file 314 in place of second program file 312. The method ends at 316.

The foregoing method is presented by way of example only and represents one of a range of methods that can readily be defined by a person skilled in the art.

In the description above and with reference to FIG. 1b, a method and apparatus for upgrading software held in read-only storage are described comprising non-reprogrammable read-only memory 116 which stores a file manager program 120, program file A 122 and program file B 124 and a Flash® RAM 118 which stores file X 132. Under control of the file manager program 120, when an upgrade program file B+ 126 is acquired, for example via the Internet, it is stored within Flash® RAM 118 and file X 132 is updated. When the software executes, file A 122 calls file B+ 126 in preference to calling file B 124, in accordance with the contents of file X 132.

The invention claimed is:

1. A method for upgrading software held within a product, the method being supported by means for program file management and program file calling, the method comprising the steps of:
   a) running a first program file from non-reprogrammable storage;
   b) accessing a reference file from the first program file, the reference file residing in reprogrammable storage;
   c) accessing a second program file by reference to the contents of the reference file, the second program file residing in non-reprogrammable storage; and
   d) updating the reference file to refer to a third program file, the third program file residing in reprogrammable storage, so that subsequently executing steps a)–c) results in accessing the third program file in place of the second program file.

2. A method as claimed in claim 1 wherein the means for program file management and program file calling is Embedded Linux.

3. A method as claimed in claim 2 wherein the reference file comprises a soft link.

4. A method as claimed in claim 1 wherein the means for program file management and program file calling is Embedded Unix.

5. A method as claimed in claim 4 wherein the reference file comprises a soft link.

6. An apparatus containing upgradable software comprising:
   a data processor operable to support the execution of a program to perform program file management and program file calling, to support the access of a file located within non-reprogrammable storage and to support the access of a file located within reprogrammable storage;
   non-reprogrammable storage operable to store the program for program file management and program file calling, to store a first program file and to store a second program file; and
   reprogrammable storage operable to store a reference file and to store a third program file, wherein the second program file or third program file is accessed by the first program file according to the contents of the reference file, and wherein the contents of the reference file is updated to reference the third program file in place of the second program file.

7. An apparatus as claimed in claim 6 wherein non-reprogrammable storage comprises a read-only memory (ROM).

8. An apparatus as claimed in claim 6 wherein reprogrammable storage comprises a Flash® RAM.

9. An apparatus as claimed in claim 6 wherein reprogrammable storage comprises a hard disk.

10. An apparatus as claimed in claim 6 wherein the third program file is obtained and downloaded via a network.

11. An apparatus as claimed in claim 6 wherein the third program file is obtained from a physical record carrier.

12. At least one medium readable by at least one data processing device and embodying executable code for causing the device to perform operations, the code comprising at least first and second programs, the operations comprising:
   repeatedly running the first program from the non-reprogrammable storage medium;
   as part of running the first program, looking for a first one of a second or third program by accessing at least one file in at least one reprogrammable storage medium, which file initially contains a reference indicating the first one of the second or third program, the first one of the second or third program residing in the non-reprogrammable storage medium;
   using the reference from the at least one file to determine a location of the first one of the second or third program to be executed responsive to the first program and updating the reference to indicate a second one of the second or third program, the second one of the second or third program residing in the reprogrammable storage medium, wherein the first one and the second one are different from each other.

13. The medium of claim 12, wherein the operations further comprise, responsive to the determination:
   initially, when the at least one file indicates the reference, running the first one of the second or third program as stored in the non-reprogrammable storage medium; and
   later, when the at least one file indicates the updated reference, running the second one of the second or third program as stored in the reprogrammable storage medium.

14. At least one data processor comprising peripherals including the medium of claim 12.

15. At least one medium, readable by at least one data processor device and embodying code for causing the device to perform operations, the operations comprising:
   initially providing a first reference indicating to a first program, the first reference being located in at least one reprogrammable storage device, to access a second program, located in the non-reprogrammable storage device;
   receiving and storing a third program into the reprogrammable storage medium, which third program comprises an update to the second program;
   receiving and storing a second reference responsive to the first program, as a substitute for the first reference, the second reference indicating to the first program to access the third program; and
   providing the second reference to the first program.

16. At least one data processor comprising peripherals including the medium of claim 15.

* * * * *